(12) United States Patent
Baarck et al.

(10) Patent No.: US 7,552,796 B2
(45) Date of Patent: Jun. 30, 2009

(54) TURBINE ENGINE TAILCONE RESONATOR

(75) Inventors: Jenny N. Baarck, Stafford Springs, CT (US); Daren Krayenvenger, Watertown, NY (US); William Proscia, Marlborough, CT (US); Christopher D. Jones, Thomaston, CT (US)

(73) Assignee: United Technologies Corporation, Hartford, CT (US)

( * ) Notice: Subject to any disclaimer, the term of this patent is extended or adjusted under 35 U.S.C. 154(b) by 367 days.

(21) Appl. No.: 11/412,756

(22) Filed: Apr. 27, 2006

(65) Prior Publication Data

US 2007/0251760 A1    Nov. 1, 2007

(51) Int. Cl.
*F01N 1/02* (2006.01)
(52) U.S. Cl. .................. 181/250; 181/212; 181/213; 181/214
(58) Field of Classification Search .......... 181/250, 181/213, 214; 123/184.57, 184.56, 184.55, 123/184.54, 184.53; 415/119; 431/114
See application file for complete search history.

(56) References Cited

U.S. PATENT DOCUMENTS

| | | | | |
|---|---|---|---|---|
| 1,995,542 A * | 3/1935 | Haviland | ................... | 285/322 |
| 2,788,803 A * | 4/1957 | Greene | ................. | 138/37 |
| 2,974,744 A * | 3/1961 | Wade | ................. | 181/217 |
| 3,187,835 A * | 6/1965 | Smith | ................. | 181/217 |
| 3,227,240 A * | 1/1966 | Lee et al. | ................. | 181/217 |
| 3,349,868 A * | 10/1967 | Kurtze | ................. | 181/217 |
| 3,401,774 A * | 9/1968 | Krahn | ................. | 181/243 |
| 3,483,698 A * | 12/1969 | Ford et al. | ................. | 60/725 |
| 3,819,007 A * | 6/1974 | Wirt et al. | ................. | 181/286 |
| 3,820,628 A * | 6/1974 | Hanson | ................. | 181/214 |
| 4,036,452 A * | 7/1977 | Schairer | ................. | 244/1 N |
| 4,106,587 A * | 8/1978 | Nash et al. | ................. | 181/213 |
| 4,473,131 A * | 9/1984 | Clegg et al. | ................. | 181/243 |
| 4,475,623 A * | 10/1984 | Gerber et al. | ................. | 181/243 |
| 4,565,260 A * | 1/1986 | Scheidt et al. | ................. | 181/243 |
| 4,757,874 A * | 7/1988 | Yanagishita et al. | ......... | 181/229 |
| 4,858,721 A * | 8/1989 | Autie et al. | ................. | 181/213 |
| 5,393,108 A * | 2/1995 | Kerr | ................. | 285/368 |
| 5,400,589 A * | 3/1995 | Mahias et al. | ................. | 60/762 |
| 5,685,140 A * | 11/1997 | Clements et al. | ................. | 60/204 |
| 5,918,572 A * | 7/1999 | Suzuki | ................. | 123/184.57 |
| 5,996,733 A * | 12/1999 | DeTuncq et al. | ................. | 181/250 |
| 6,139,259 A * | 10/2000 | Ho et al. | ................. | 415/119 |
| 6,213,077 B1 * | 4/2001 | Horii | ................. | 123/184.57 |
| 6,279,965 B1 * | 8/2001 | Kida | ................. | 285/268 |
| 6,379,110 B1 * | 4/2002 | McCormick et al. | ........ | 415/119 |
| D464,597 S * | 10/2002 | Bassani | ................. | D12/194 |
| 6,508,331 B1 * | 1/2003 | Stuart | ................. | 181/250 |
| 6,581,583 B2 * | 6/2003 | Leen | ................. | 123/573 |
| 6,698,390 B1 * | 3/2004 | Kostun et al. | ................. | 123/184.57 |
| 6,732,509 B2 * | 5/2004 | Shiga | ................. | 60/312 |

(Continued)

*Primary Examiner*—Jeffrey Donels
*Assistant Examiner*—Forrest M Phillips
(74) *Attorney, Agent, or Firm*—Bachman & LaPointe, P.C.

(57) ABSTRACT

A turbine engine resonator comprising a panel and a vessel. The panel is along a flow path within the engine and has an aperture. The vessel has a mounting flange secured to the panel. The flange has an aperture mated to the aperture of the panel. The vessel has a body secured to the mounting flange with an interior of the body in communication with the flange aperture. A first portion of the panel extends into the mounting flange aperture and may redirect a leakage flow, if any, to limit an effect of leakage upon resonator performance.

27 Claims, 6 Drawing Sheets

U.S. PATENT DOCUMENTS

| | | | |
|---|---|---|---|
| 6,748,915 B2 * | 6/2004 | Cole et al. | 123/184.53 |
| 6,758,304 B1 * | 7/2004 | McLean | 181/206 |
| 6,767,036 B2 * | 7/2004 | Barker et al. | 285/382 |
| 6,883,302 B2 * | 4/2005 | Koshoffer | 60/204 |
| 6,889,648 B2 * | 5/2005 | Koch et al. | 123/184.47 |
| 6,938,728 B2 * | 9/2005 | Chae et al. | 181/229 |
| 7,017,707 B2 * | 3/2006 | Zia et al. | 181/268 |
| 7,051,523 B2 * | 5/2006 | Kerchner | 60/322 |
| 7,225,780 B2 * | 6/2007 | Khami et al. | 123/184.57 |
| 7,322,195 B2 * | 1/2008 | Borja et al. | 60/725 |
| 7,337,875 B2 * | 3/2008 | Proscia et al. | 181/214 |
| 7,350,619 B2 * | 4/2008 | Williams | 181/214 |
| 2002/0139120 A1 * | 10/2002 | Sheoran et al. | 60/772 |
| 2004/0046391 A1 * | 3/2004 | Vasudeva | 285/368 |
| 2004/0118104 A1 * | 6/2004 | Koshoffer | 60/204 |
| 2005/0252476 A1 * | 11/2005 | Inoue | 123/184.57 |
| 2005/0284690 A1 * | 12/2005 | Proscia et al. | 181/214 |
| 2006/0032699 A1 * | 2/2006 | Kyu | 181/250 |
| 2006/0034682 A1 * | 2/2006 | McMillan | 415/173.4 |
| 2006/0231329 A1 * | 10/2006 | Borja et al. | 181/250 |
| 2007/0102235 A1 * | 5/2007 | Tobik et al. | 181/250 |
| 2007/0160459 A1 * | 7/2007 | Tudor | 415/119 |
| 2007/0251760 A1 * | 11/2007 | Baarck et al. | 181/250 |

* cited by examiner

(PRIOR ART)

*FIG. 13*

TURBINE ENGINE TAILCONE RESONATOR

U.S. GOVERNMENT RIGHTS

The invention was made with U.S. Government support under contract F33657-99-C-1236 awarded by the Air Force. The U.S. Government has certain rights in the invention.

BACKGROUND OF THE INVENTION

The invention relates to turbine engines. More particularly, the invention relates to tailcone resonator arrays.

U.S. patent application Ser. No. 11/109,930 of Borja et al. and entitled "Acoustic Dampers" discloses use of a Helmholtz resonator array to suppress screech in a gas turbine engine. The disclosure of said application is incorporated by reference herein as if set forth at length.

SUMMARY OF THE INVENTION

One aspect of the invention involves a turbine engine resonator comprising a panel and a vessel. The panel is along a flow path within the engine and has an aperture. The vessel has a mounting flange secured to the panel. The flange has an aperture mated to the aperture of the panel. The vessel has a body secured to the mounting flange with an interior of the body in communication with the flange aperture. A first portion of the panel extends into the mounting flange aperture and may redirect a leakage flow, if any, to limit an effect of leakage upon resonator performance.

Another aspect of the invention involves a turbine engine resonator comprising a panel and a vessel. The panel is along a flow path within the engine and has an aperture. The vessel has a mounting flange secured to the panel. The flange has an aperture mated to the aperture of the panel. The vessel has a body secured to the mounting flange with an interior of the body in communication with the flange aperture. The panel has a seat circumscribing the panel aperture. The mounting flange has a seat circumscribing the mounting flange aperture. The mounting flange has a pair of mounting ears secured to the panel by an associated fastener to hold the mounting flange seat engaged to the panel seat by an interference mounting.

Another aspect of the invention involves a turbine engine having a case. A centerbody is within the case and separated from the case by a core flowpath. A circumferential array of augmentor vanes extend between the centerbody and case. A circumferential array of resonators are within the centerbody and each has a port open to the core flowpath. Each said resonator comprises a resonator body having a neck and an enlarged main body inboard of the neck, main body having a convex first circumferential side and a concave second circumferential side converging inboard, each first circumferential side nested with the second adjacent side of a first adjacent one of the resonators and each second circumferential side nested with the first adjacent side of a second adjacent one of the resonators.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
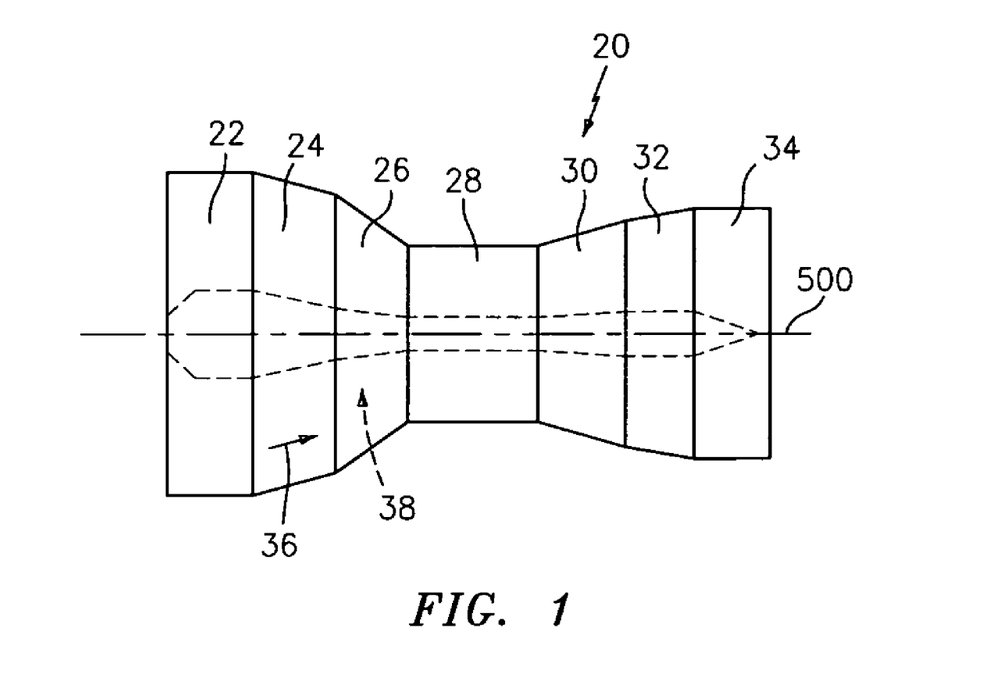
FIG. 1 is a schematic view of a gas turbine engine.

FIG. 1 shows an exemplary engine 20 having a central longitudinal axis 500. From an upstream inlet end to a downstream outlet/exhaust end, the exemplary engine includes a number of sections: a fan section 22; a low pressure compressor section 24; a high pressure compressor section 26; a combustor section 28; a high pressure turbine section 30; a low pressure turbine section 32; and an augmentor 34. A first airflow 36 is driven along a core flowpath 38 through the various sections. An additional bypass airflow may be driven along a bypass flowpath (not shown).

Figure 2:
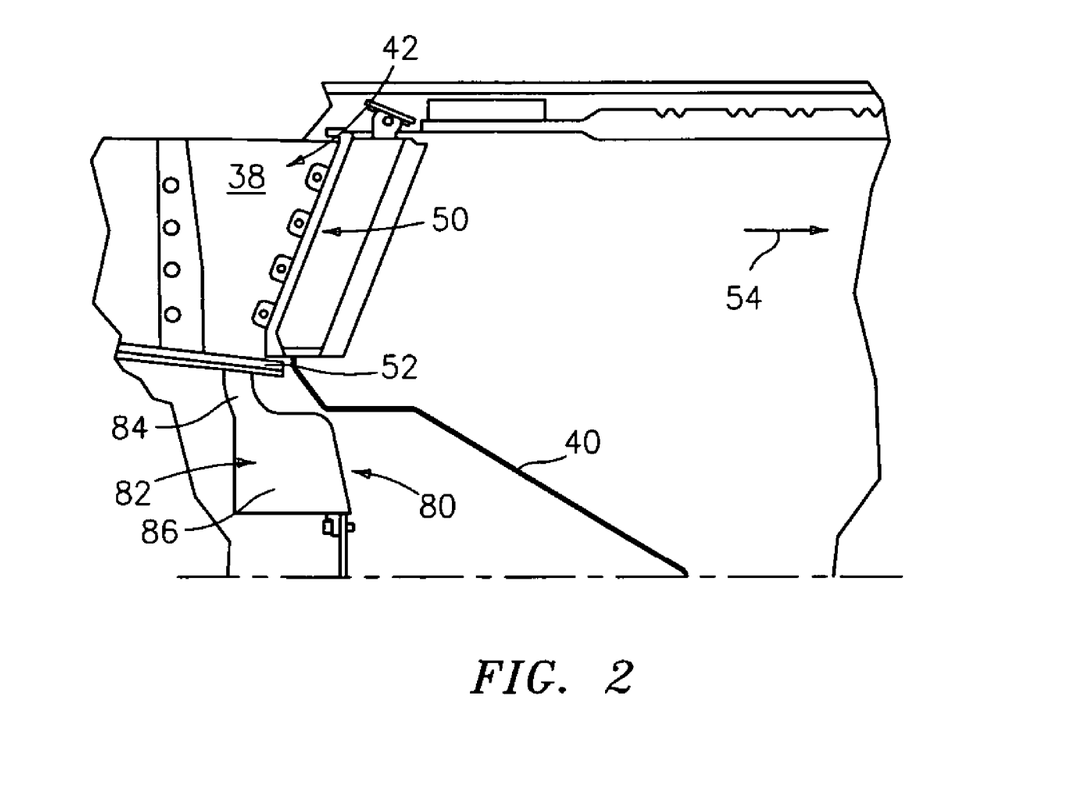
FIG. 2 is a partial longitudinal sectional view of a tailcone area of the engine of FIG. 1.

FIG. 2 shows a tailcone 40 forming the downstream end of a centerbody within the core flowpath 38 inboard of a turbine exhaust case 42. Immediately upstream of the tailcone, a circular array of vanes 50 of the augmentor radially span between the centerbody and the turbine exhaust case 42. A nozzle (not shown) may be downstream of the turbine exhaust case. Although illustrated with respect to an integrated augmentor, the inventive principles discusses below may also be applied to remote augmentors.

Along an inboard portion of the core flowpath 38 between the vanes, the centerbody periphery is formed by an array of inner diameter (ID) panels 52. The exemplary panels 52 are arcuate to correspond to the shape and orientation of the vanes.

Figure 3:
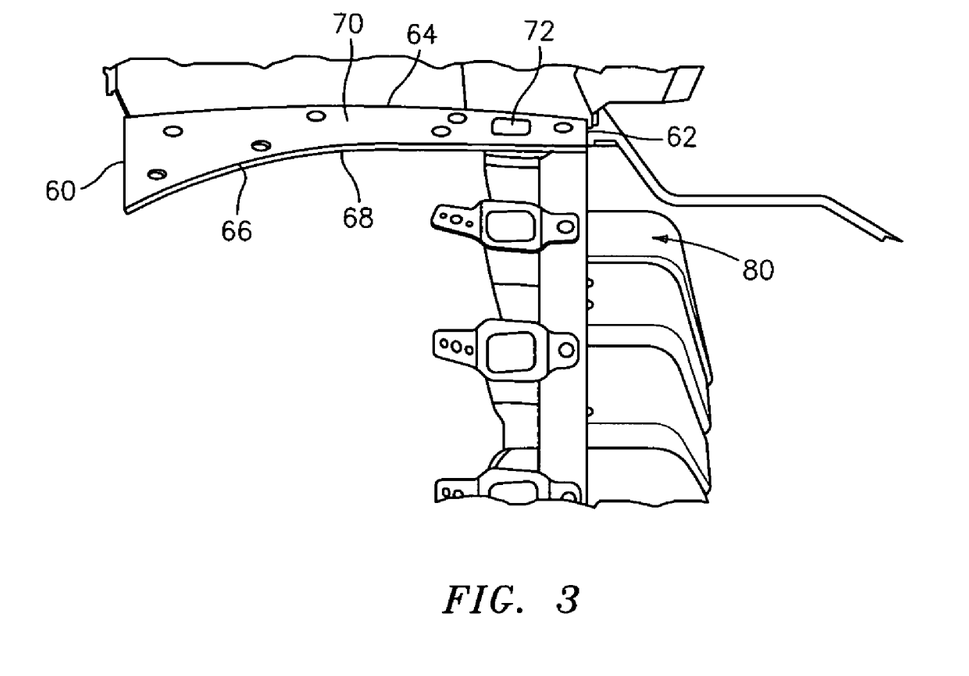
FIG. 3 is a cutaway view of the tailcone area of FIG. 2.

Trailing edge (TE) box portions of the vanes 52 contain fuel spraybars (not shown) for introducing fuel to the initial exhaust flow 54 (the combusted airflow 36) passing over/between the vanes. The exemplary ID panels 52 (FIG. 3) have leading and trailing edges 60 and 62 and first and second circumferential sides 64 and 66. The panels 52 have inboard and outboard surfaces 68 and 70. Relatively near the trailing edge 62, each panel 52 includes an aperture 72 between the inboard and outboard surfaces 68 and 70.

The apertures 72 define ports for Helmholtz resonators 80. The exemplary resonators 80 (FIG. 2) include an associated resonator vessel 82 mounted inboard of the associated panel 52. The exemplary vessel 82 includes a body having an outboard neck 84 and an inboard main portion 86. The exemplary neck 84 extends from a forward/upstream end of the exemplary main portion 86. The remainder of the main portion extends downstream partially into the interior of the tailcone 40.

Figure 4:
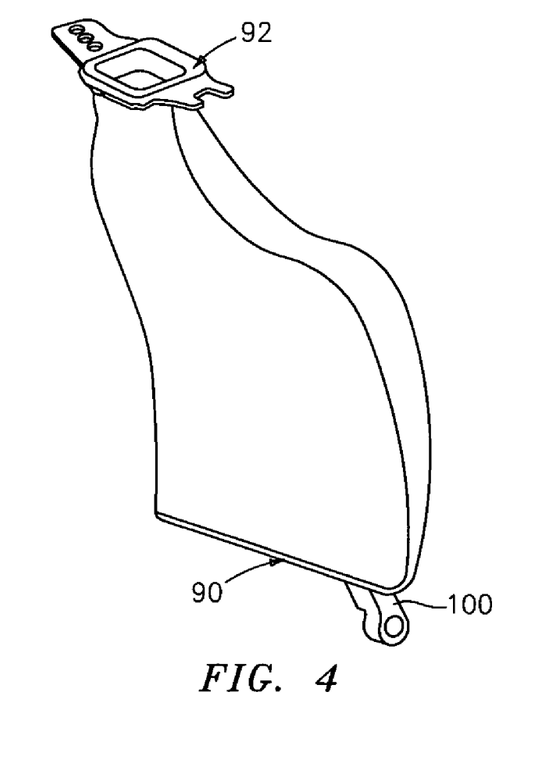
FIG. 4 is a view of a resonator.
Figure 5:
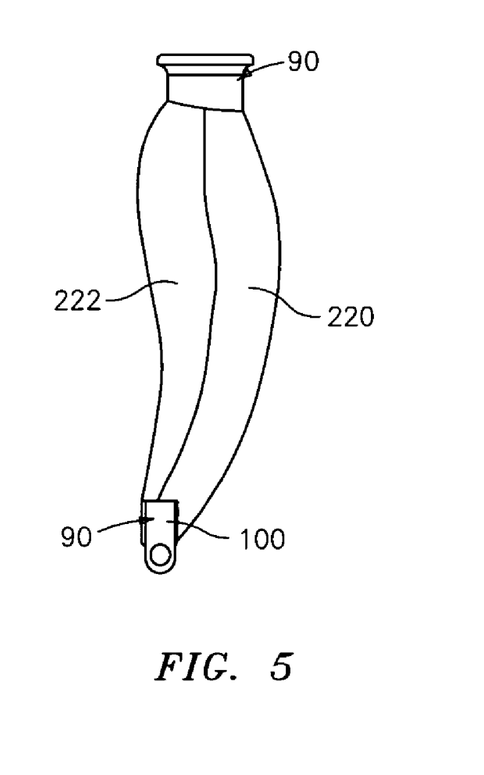
FIG. 5 is an aft/downstream view of the resonator of FIG. 4.
Figure 6:
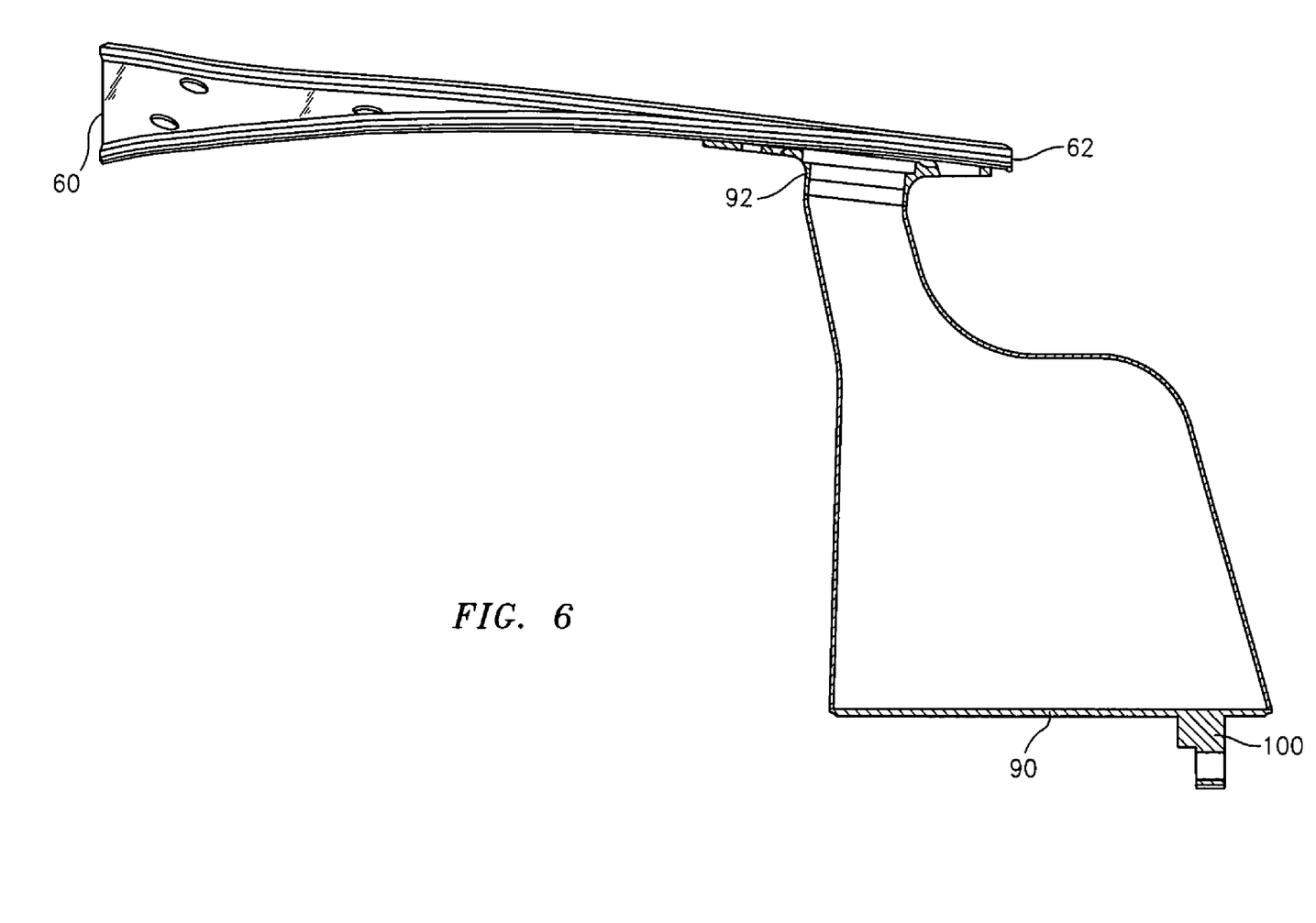
FIG. 6 is a cutaway view of the resonator of FIG. 4 attached to an ID panel.
Figure 7:
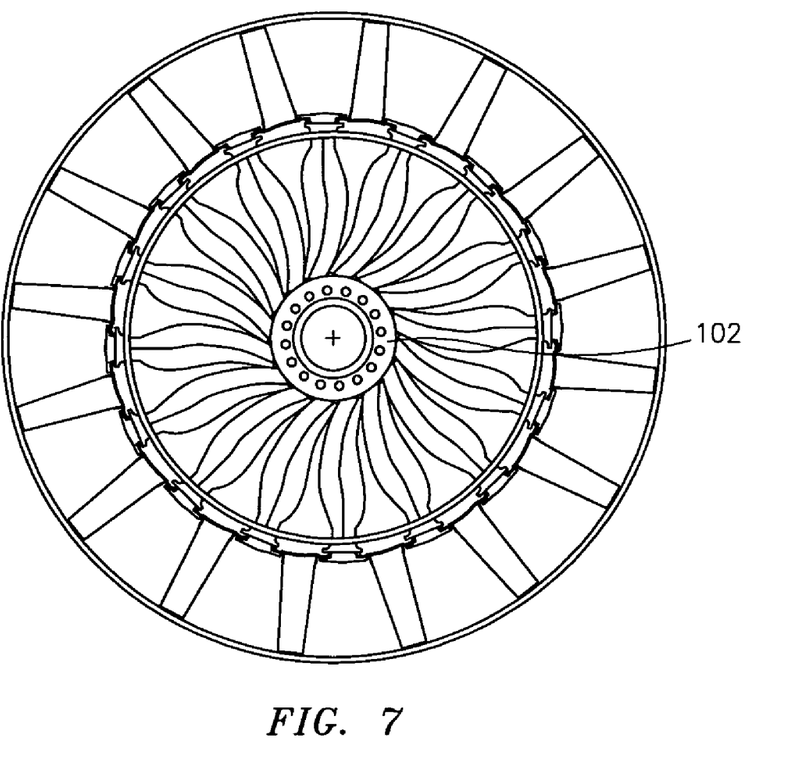
FIG. 7 is an aft/downstream view of an array of such resonators.

As is discussed in further detail below, the exemplary vessel 82 comprises a pair of sheet metal stampings welded to each other and closed at their inboard ends by a cast or machined ID bracket 90 (FIGS. 4-6). At their outboard ends, the stampings are secured to a neck flange 92 mounting the resonator vessel 82 to the ID panel 52. Each exemplary bracket 90 includes, near the rear/trailing end thereof, an apertured mounting ear 100. The ears 100 are bolted to associated bolt holes of a central mounting ring 102 (FIG. 7) to integrate the various resonator vessels into a rigid assembly.

Figure 8:
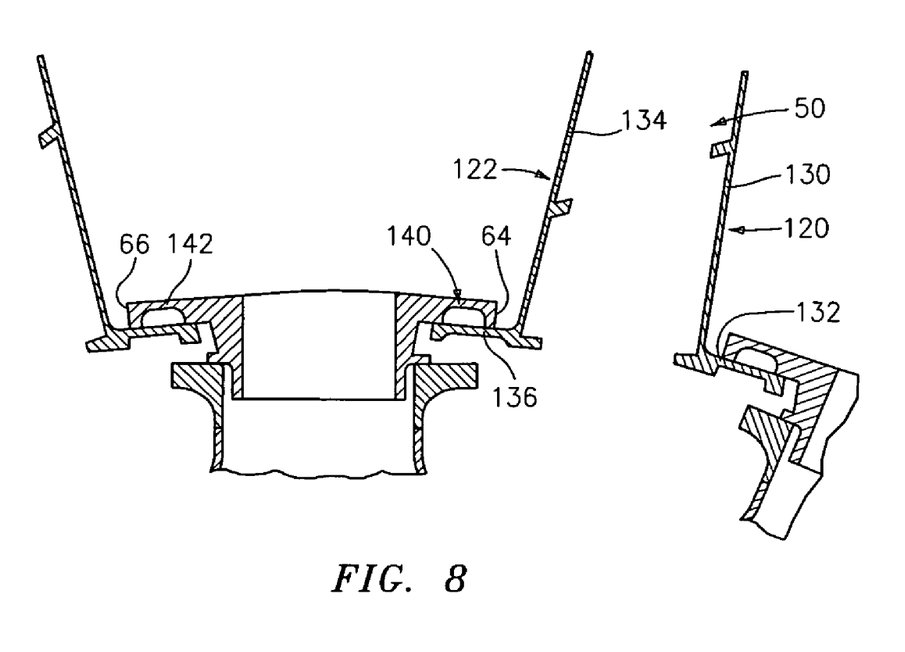
FIG. 8 is a partial transverse sectional view of the resonator array.

FIG. 8 shows a relationship between the ID panels 52 and the adjacent vanes 50. Each vane 50 has a first side 120 and a second side 122. Structurally, each vane side may typically include one or more streamwise panels. An exemplary first side panel includes a generally radially and streamwise-extending sidewall 130 and a generally circumferential and streamwise-extending flange 132 at an inboard end of the panel and projecting circumferentially outward from the vane. Similarly, the second side panel has a sidewall 134 and a flange 136. The exemplary flanges 132 and 136 are captured beneath side portions of the adjacent ID panel 52. Specifically, a first portion 140 along the first side 64 of the ID panel captures the flange 136 of the adjacent second panel of one adjacent vane while a side portion 142 along the second side 66 captures the flange 132 of the first panel of the previous vane (viewed counterclockwise when looking aft-to-fore). A fastener array along the portions 140 and 142 may secure those portions to the associated flanges 136 and 132 with the underside of the portion 140 or 142 compressingly engaged to the outboard face of the flange 136 or 132 (optionally with an intervening seal/gasket).

The exemplary joint between the resonator vessel and ID panel comprises a hard interference fit maintained by a pair of fasteners (e.g., bolts). For the bolting engagement, the exemplary flange 92 includes an apertured upstream mounting ear 150 (FIG. 9) and an apertured downstream mounting ear 152. These ears align with corresponding apertures in the ID panel 52 to receive bolts 160 and 162 (e.g., having heads recessed approximately flush to the panel outboard surface and shaft receiving nuts along the ear undersides). The exemplary flange 92 includes an outwardly protruding boss whose rim forms a seat 170 surrounding an aperture defined by an aperture surface 172. The exemplary surface 172 is smooth and continuous with an interior surface 174 of the resonator body.

Figure 9:
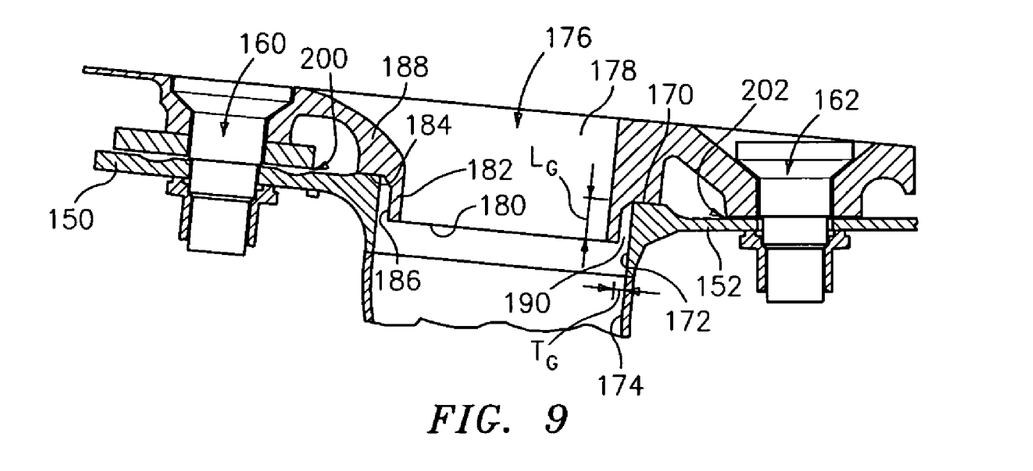
FIG. 9 is a longitudinal sectional view of a junction between a resonator and its associated ID shroud.

A port 176 is formed in the ID panel 52. A surface 178 extends radially inward from the port 176 to an inboard rim 180. A terminal portion of the surface 178 is generally straight in section (i.e., not diverging or converging). The rim 180 is at the inboard end of a lip or collar portion 182 of the panel. The collar portion 182 extends inward from an external shoulder 184 and has an exterior surface 186. A thicker collar or boss portion 188 may be located outboard of the shoulder 184. The shoulder 184 forms a mating seat engaging the flange seat 170. The collar exterior surface 186 is locally spaced apart from the surface 172 by a gap 190. The exemplary gap 190 has an overall length $L_G$ and a characteristic thickness (e.g., a median thickness $T_G$). An exemplary $L_G$ is 0.171 (nominal) +/−0.008 inch. Broader $L_G$ ranges are 0.15-0.30 inch and 0.16-0.20 inch. An exemplary $T_G$ is 0.045 (nominal) +/−0.043 inch. Broader $T_G$ ranges are 0.001-0.15 inch and 0.002-0.12 inch.

In a relaxed condition (e.g., before tightening of the bolts 160 and 162), there are gaps 200 and 202 between the ear outboard surfaces and the mating surfaces of the inboard face of the panel (or of any intervening components such as a washer or spacer). In the relaxed condition, there is contact between the seats 170 and 184. Exemplary gaps 200 and 202 have thicknesses of 0.014 inch and 0.009 inch. However, the specific gaps will be influenced by a variety of specific engineering details of the particular flange 92 and ID panel 52. Generally, exemplary gaps may be 0.06-0.25 inch. However, other values are possible. The result in tightening is to close the gaps 200 and 202 and elastically deform the flange 92 between the bolted portions of the ears and the collar. This the gaps create a hard interference fit with metal-to-metal contact at the seats 170 and 84 without an intervening rope seal, gasket, or the like. The bolting tension and flange elastic deformation maintain the engagement force between the seats. Exemplary interference fit is sufficiently robust to reduce and preferably largely eliminate leakage of the wide operating envelope. However, some leakage may be inevitable.

To reduce the effect of a given amount of leakage, the depending collar 182 acts to redirect any leakage flow radially inward along the annular gap 190. Thus, this flow may be discharged into the resonator with more of a radial inward component than a component normal to the wall of the neck/throat. This redirection may reduce a fluidic throat effect which might, for example, tend to vary the tuning of the resonator responsive to the leakage flow.

Returning to FIG. 5 the exemplary resonator vessel first and second side panels 220 and 222 are respectively seen. Along the main body, the first panel 220 is generally outwardly convex whereas the second panel 222 is generally outwardly concave. The panels generally converge inboard toward each other. The convex/concave combination permits internesting of the resonators in the resonator array. The this provides a compromise of traditional Helmholtz Resonator shape to accommodate the existing turbine exhaust case and augmentor hardware while still providing effective resonator volume and length dimensions with in the resonator.

The inventive resonator may be implemented in the remanufacture or reengineering of a baseline engine or configuration thereof. The baseline configuration may include an existing tailcone resonator or may lack a tailcone resonator. If the baseline configuration includes a resonator, the revised configuration may provide one or both of enhanced leakage control and reduced sensitivity to leakage.

Figure 10:
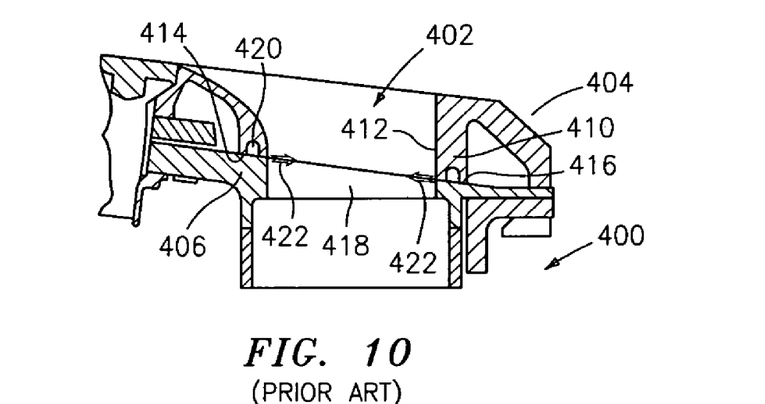
FIG. 10 is a sectional view of a test rig simulating a prior art junction.

FIG. 10 shows the port area of an exemplary baseline resonator 400. The port 402 is formed in an ID panel 404 mated to a resonator mounting flange 406. Surrounding the port, the panel 404 includes a depending collar 410 having an interior surface 412 and extending to an inboard rim 414. The inboard rim 414 butts against a seating surface 416 of the flange 406 surrounding an aperture surface 418 of the flange. The exemplary rim 414 has a recess accommodating a rope seal 420. The exemplary surfaces 412 and 418 are aligned so as to present a smooth continuous port surface.

Figure 11:
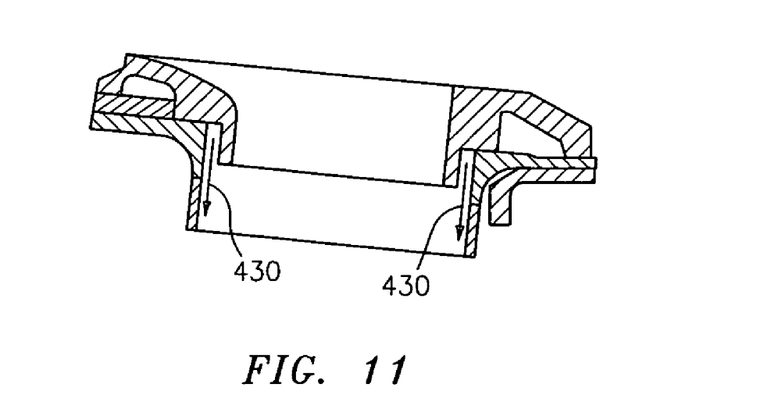
FIG. 11 is a test rig simulating the junction of FIG. 9.

Due, for example, to any of static, dynamic, or thermal loading, there may be leakage 422 around the seal 420. This leakage is nearly normal to the resonator throat and may have a relatively large effect in degrading resonator performance. In the exemplary present resonator 80, the depending panel collar functions to redirect any leakage flow 430 (FIG. 11) off-normal to the resonator throat (radially inward in the exemplary resonator). This may reduce the degradation associated with a given leakage amount. Additionally, the hard interference seal may further limit the amount of leakage.

Figure 12:
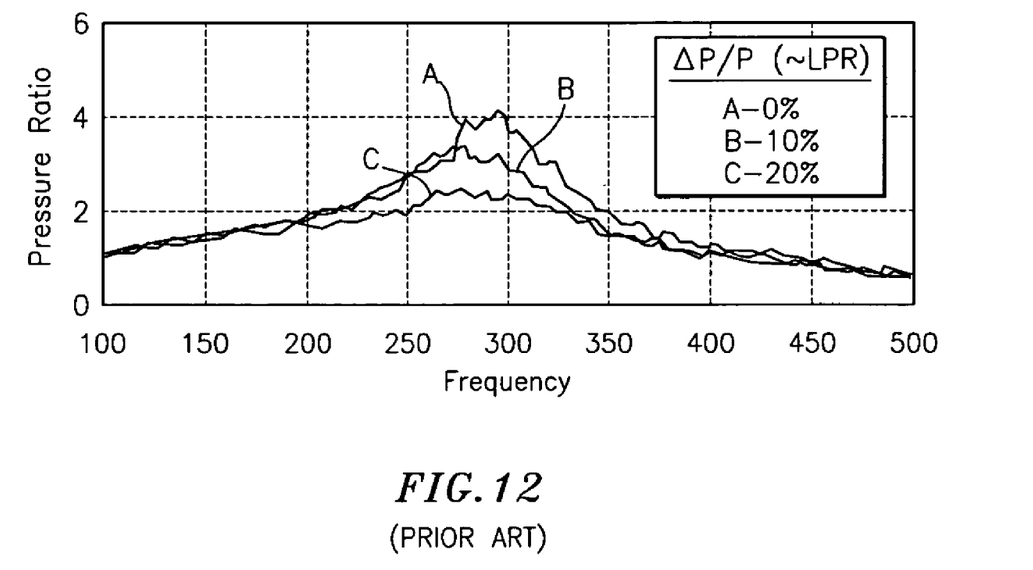
FIG. 12 is a pressure ratio-frequency plot for the junction of FIG. 10.
Figure 13:
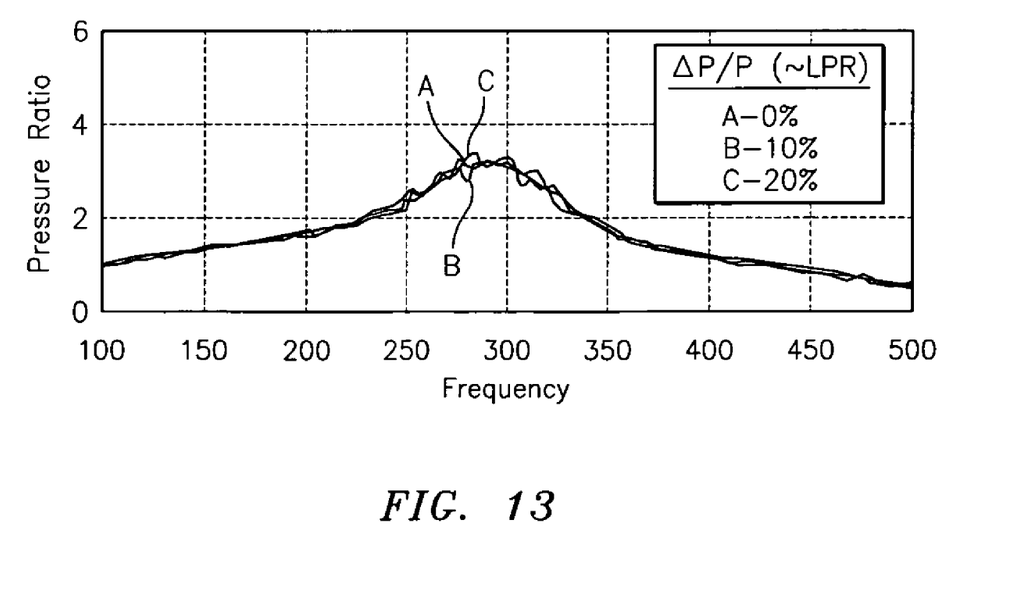
FIG. 13 is a pressure ratio-frequency plot for the junction of FIG. 11.

To assess the functionality of the leakage flow redirection, test resonator were assembled by rapid prototyping apparatus to simulate the baseline resonator and the reengineered resonator but with a similar leakage flow. Thus these tests discount any leakage reduction. FIGS. 12 and 13 show, respectively for the baseline and reengineered resonators, ratios of cavity pressure to face/port pressure against frequency. Each graph includes three traces at three different nominal values of ΔP/P (the pressure difference across the resonator normalized by the supply pressure): 0, 10% and 20%. Typical engine operating ΔP/P are in excess of 20% (also designated as a liner pressure ratio (LPR) in excess of 1.20). The baseline resonator is clearly seen to suffer a substantial degradation in performance with increasing ΔP/P. The reengineered resonator is relatively insensitive, offering much better performance in typical operating conditions.

Such test resonators may be used in the reengineering process by measuring performance for a variety shapes/dimensions/positions of the panel lip and its associated gap to optimize performance in view of any other applicable factors.

To test leakage control, actual hardware may be subject to stresses and resulting leakage measures. Also, simulation may be effective to further confirm that material stresses remain within acceptable limits for any given configuration.

One or more embodiments of the present invention have been described. Nevertheless, it will be understood that various modifications may be made without departing from the spirit and scope of the invention. For example, in a remanufacturing of an existing engine or reengineering of a configuration thereof, details of the existing configuration may influence details of any particular implementation. Accordingly, other embodiments are within the scope of the following claims.

What is claimed is

1. A turbine engine resonator comprising:
a panel along a flow path within the engine and having an aperture;
a resonator vessel having:
a mounting flange secured to the panel and having an aperture mated to the aperture of the panel; and
a body secured to the mounting flange with an interior of the body in communication with the flange aperture, wherein:
a first portion of the panel extends into the mounting flange aperture.

2. The resonator of claim 1 wherein:
a gap, open toward the body interior, circumscribes the first portion.

3. The resonator of claim 1 wherein:
the first portion is an uninterrupted collar.

4. The resonator of claim 1 wherein:
a gap, open toward the body interior, fully circumscribes the first portion.

5. The resonator of claim 4 wherein:
the gap has a median thickness of 0.002-0.09 inch and a median length of at least 0.15 inch.

6. The resonator of claim 1 wherein:
mating seats of the panel and flange, respectively circumscribing the panel aperture and flange aperture are compressively engaged in the absence of a gasket.

7. The resonator of claim 1 wherein:
the resonator body comprises a neck and an enlarged main body inboard of the neck, the neck extending radially outboard from a forward end of the main body.

8. The resonator of claim 1 wherein:
the resonator body comprises a neck and an enlarged main body inboard of the neck, main body having a convex first circumferential side and a concave second circumferential side converging inboard.

9. The resonator of claim 1 wherein:
the resonator body comprises a pair of sheet metal stampings respectively forming a pair of circumferential sides and an inboard bracket mounting the body to a plurality of other resonators.

10. A turbine engine comprising:
a circumferential array of resonators of claim 1 each said panel secured to a single said resonator vessel; and
a circumferential array of augmentor vanes interspersed with said panels.

11. A turbine engine resonator comprising:
a panel along a flow path within the engine and having an aperture;
a resonator vessel having:
a mounting flange secured to the panel and having an aperture mated to the aperture of the panel; and
a body secured to the mounting flange with an interior of the body in communication with the flange aperture, wherein:
at least one of the mounting flange and panel form means for directing a leakage flow so as to limit an effect of said leakage flow upon resonator performance.

12. The resonator of claim 11 wherein:
the means comprises a lip depending from the panel only partially into the flange.

13. A method for engineering a turbine engine centerbody resonator, the resonator comprising:
a panel along a flow path within the engine and having an aperture;
a resonator vessel having:
a mounting flange secured to the panel and having an aperture mated to the aperture of the panel; and
a body secured to the mounting flange with an interior of the body in communication with the flange aperture, the method comprising:
configuring a protrusion of a first portion of the panel into the mounting flange aperture to produce a leakage flow redirection effective to limit a leakage flow sensitivity of the resonator.

14. The method of claim 13 wherein configuring comprises:
testing with a controlled leakage; and
measuring a resonator performance at a plurality of conditions with the controlled leakage.

15. The method of claim 13 wherein configuring comprises:
testing with a controlled leakage; and
measuring a resonator performance at a across a plurality of frequency values for each of a plurality of ΔP/P values.

16. The method of claim 13 wherein configuring comprises:
varying a length of protrusion of the first portion; and
varying a thickness of a gap around the first portion.

17. A turbine engine resonator comprising:
a panel along a flow path within the engine and having an aperture;
a resonator vessel having:
a mounting flange secured to the panel and having an aperture mated to the aperture of the panel; and
a body secured to the mounting flange with an interior of the body in communication with the flange aperture, wherein:
the panel has a seat circumscribing the panel aperture;
the mounting flange has:
a seat circumscribing the mounting flange aperture; and a pair of mounting ears secured to the panel by an associated fastener to hold the mounting flange seat engaged to the panel seat by an interference mounting.

18. The resonator of claim 17 wherein:

in a relaxed state of the mounting flange, with the mounting flange seat contacting the panel seat, there is a gap between each of the pair of mounting ears and an associated mating portion of the panel.

19. The resonator of claim 17 wherein:

a lip portion of the mounting flange extends into the mounting flange aperture.

20. A turbine engine resonator comprising:

a panel along a flow path within the engine and having an aperture;

a resonator vessel having:

a mounting flange secured to the panel and having an aperture mated to the aperture of the panel; and     a body secured to the mounting flange with an interior of the body in communication with the flange aperture, wherein:

at least one of the mounting flange and panel form means for interference mounting the mounting flange to the panel.

21. The apparatus of claim 20 wherein:

the resonator is a single port resonator; and the body has a single interior.

22. A method for engineering a turbine engine centerbody resonator, the resonator comprising:

a panel along a flow path within the engine and having an aperture;

a resonator vessel having:

a mounting flange secured to the panel and having an aperture mated to the aperture of the panel; and     a body secured to the mounting flange with an interior of the body in communication with the flange aperture, the method comprising:

configuring at least one of the panel and mounting flange to provide an interference mounting of the mounting flange to the panel effective to provide a desired leakage control.

23. The method of claim 22 wherein:

in a relaxed state of the mounting flange, with a mounting flange seat contacting a panel seat, there is a gap between each of the pair of mounting ears and an associated mating portion of the panel; and the configuring comprises selecting a size of said gaps.

24. A turbine engine comprising:

a case;

a centerbody within the case and separated from the case by a core flowpath;

a circumferential array of augmentor vanes extending between the centerbody and case; and a circumferential array of resonators within the centerbody and each having a port open to the core flowpath, wherein:

each said resonator comprises a resonator body having a neck and an enlarged main body inboard of the neck, main body having a convex first circumferential side and a concave second circumferential side converging inboard, each first circumferential side nested with the second adjacent side of a first adjacent one of the resonators and each second circumferential side nested with the first adjacent side of a second adjacent one of the resonators.

25. The turbine engine of claim 24 wherein:

in each resonator the neck extends radially outboard from a forward end of the main body.

26. The turbine engine of claim 24 wherein:

each resonator body comprises a pair of sheet metal stampings respectively forming a pair of circumferential sides and an inboard bracket; and a common mounting ring is secured to the inboard brackets to secure each resonator to the other resonators.

27. The turbine engine of claim 24 wherein:

each said resonator has a single said port formed in a uniquely associated ID panel.

* * * * *